(12) United States Patent
Schaefer (10) Patent No.: US 7,221,437 B1
(45) Date of Patent: May 22, 2007

(54) METHOD AND APPARATUS FOR MEASURING DISTANCES USING LIGHT

(76) Inventor: Philip R. Schaefer, 88 High Country Rd., Weaverville, NC (US) 28787

( * ) Notice: Subject to any disclaimer, the term of this patent is extended or adjusted under 35 U.S.C. 154(b) by 0 days.

(21) Appl. No.: 10/641,850

(22) Filed: Aug. 15, 2003

Related U.S. Application Data (60) Provisional application No. 60/405,079, filed on Aug. 20, 2002.

(51) Int. Cl.
*G01C 3/08* (2006.01)
*G01P 3/36* (2006.01)

(52) U.S. Cl. ........................ 356/4.07; 356/4.01; 356/28

(58) Field of Classification Search ...... 356/4.01–5.15, 356/28; 345/163–166
See application file for complete search history.

(56) References Cited

U.S. PATENT DOCUMENTS

| | | | | |
|---|---|---|---|---|
| 4,716,430 A | * | 12/1987 | Stauffer ...................... | 396/106 |
| 4,752,799 A | * | 6/1988 | Stauffer ...................... | 396/109 |
| 4,988,981 A | * | 1/1991 | Zimmerman et al. ....... | 345/158 |
| 5,149,952 A | * | 9/1992 | Tanaka et al. ............. | 250/559.1 |
| 5,229,829 A | * | 7/1993 | Nihei et al. ................ | 356/4.06 |
| 5,532,813 A | | 7/1996 | Ohishi et al. | |
| 5,541,723 A | | 7/1996 | Tanaka | |
| 5,682,229 A | * | 10/1997 | Wangler ..................... | 356/4.01 |
| 5,686,942 A | * | 11/1997 | Ball ........................... | 345/158 |
| 5,701,006 A | | 12/1997 | Schaefer | |
| 5,865,443 A | * | 2/1999 | Abe ........................... | 277/448 |
| 5,963,309 A | | 10/1999 | Nakanishi et al. | |
| 6,172,375 B1 | | 1/2001 | Kindaichi | |
| 6,198,470 B1 | * | 3/2001 | Agam et al. ............... | 345/157 |

OTHER PUBLICATIONS

Foley, James D.; Chapter 16 Shading Models "Fundamentals of Interactive Computer Graphics" Copyright 1982; pp. 575-580; Addison-Wesley Publishing Company, Inc.

\* cited by examiner

*Primary Examiner*—Thomas H. Tarcza
*Assistant Examiner*—Isam Alsomiri
(74) *Attorney, Agent, or Firm*—John D. Lister

(57) ABSTRACT

A method and device for measuring a distance to an object with light determines the distance by measuring the relative intensity of light reflected from the object and traveling over two or more paths of differing optical length. Light is emitted by one or more light sources; reflected from a surface of the object; and the reflected light is detected by one or more light detectors. The light detector(s) generate signals based on the intensity of reflected light detected and the signals are utilized to calculate the distance from the device to the object.

10 Claims, 10 Drawing Sheets

METHOD AND APPARATUS FOR MEASURING DISTANCES USING LIGHT

CROSS-REFERENCE TO RELATED APPLICATIONS

This application claims the benefit of U.S. Provisional Application No. 60/405,079, filed Aug. 20, 2002.

GOVERNMENT LICENSE RIGHTS

This invention was made with United States government support under one or more SBIR grants from the National Institutes of Health. The United States government has certain rights in this invention.

BACKGROUND OF THE INVENTION

The subject invention relates to a method and device for measuring a distance from the device to an object using light, and, more specifically, to a method and device for measuring a distance from the device to an object wherein light is emitted from one or more light sources of the device and reflected from a surface of the object to one or more light detectors of the device. The light travels over paths of differing length between the light source(s), the object reflecting the light, and the light detector(s). The light intensity measured by the light detector(s) generates electrical signals that are used to calculate the distance from the device to the object.

There are various applications in which it is desirable to use light to measure distances. Examples of such applications include measuring a distance between a camera and a subject for auto focusing, measuring distances during surveying, measuring astronomical distances, etc. Correspondingly, a variety of methods that use light for measuring distances have been described. One method for measuring distances with light is to measure the time for a light pulse to travel between two points. For example, U.S. Pat. No. 5,532,813, Ohishi et al, discloses a method for measuring distances using lasers wherein a distance measuring means calculates relatively long distances, e.g. kilometers in distance, to a target based on the time difference between a light beam emission and the reception of a return light beam from the target. However, the lasers and optics in such approaches are too complex and expensive for budget limited or highly miniaturized applications. Other, lower cost methods for the time of flight measurement of distances have been described. For example, U.S. Pat. No. 5,701,006, Schaefer, discloses a method for measuring distances in which Light Emitting Diodes (LEDs) and photodetectors are used in fiber optics, and modulation frequencies in the MHz range are used to measure time delays. Although such approaches use lower-cost LEDs and photodetectors, relatively short, properly shaped pulses are required. Electronics in the radio frequency range must also be used to process the signals. These factors introduce higher levels of noise into the overall system, thus relatively complex electronics circuitry or specialized, high power pulse generation at the LED is needed.

For applications such as camera focusing, it is common to transmit a light spot with an LED, then receive an image of the spot at the receiver. By measuring the location of the spot on the received image, the distance to the subject can be determined by triangulation. The basic approach is subject to problems with range and reliability, and various improvements have been described in the following patents. For example, U.S. Pat. No. 5,541,723, Tanaka, discloses a method of measuring distances that involves the transmission at different angles of two differing light distributions. In this method, the information on the amount of signals received tells how much signal does not impinge on the object of interest. Nakanishi, et al., in U.S. Pat. No. 5,963,309, shows multiple LEDs and photodetectors that are used to increase the range and resolution. Kindaichi, in U.S. Pat. No. 6,172,375, uses two spaced lens that form images. From these images, positions are measured and calculated for the purpose of increasing the reliability of measurements. However, these approaches still require the use of lenses in order to obtain images of light spots or patterns. The need for lenses increases the bulk as well as the cost of a distance measuring system.

OBJECTS AND ADVANTAGES OF THE PRESENT INVENTION

Therefore, several objects and advantages of the present invention are:

(a) to provide a system for measuring distances with light,
(b) to provide distance measurement without the need for lenses, enabling an optics measurement system using only Light Emitting Diodes (LEDs) and photodiodes in the optics,
(c) to provide this feature without the need to measure the position of received light on an image,
(d) to provide a system that can perform distance measurements rapidly, and
(e) to provide a system to obtain images of distance data.

Still further objects and advantages of the present invention will become apparent from a consideration of the ensuing description and drawings.

SUMMARY OF THE INVENTION

The present invention is a system for measuring the distance to an object, using light. The light intensity over multiple paths is measured, the paths being of differing optical length. The relative light intensity from the paths is used to calculate the distance to the object.

In one embodiment of the present invention, two or more light sources and one light detector are used. Light is sequentially transmitted from each source, and received at the light detector. In another embodiment of the present invention, one light source and two or more light detectors are used. Light is simultaneously received at both light detectors.

In another embodiment of the present invention, light is sequentially transmitted from two or more light sources, and an imaging device, such as a digital camera, is used to provide an array of distances containing distance information in each pixel.

While the distance measuring system of the present invention may be used to measure various distances from distances less than 10 centimeters in length to distances up to or greater than 5 meters in length, the distance measuring system of the present invention provides an inexpensive, noncomplex, easy to use, distance measuring system that is particularly well suited for measuring and/or monitoring distances to an object wherein the distance from the distance measuring system to the object ranges from about 10 centimeters to about 5 meters. Over this preferred measurement range, the distance measuring system of the subject invention has an accuracy of about ±10%.

DESCRIPTION OF THE PREFERRED EMBODIMENTS

Figure 1:
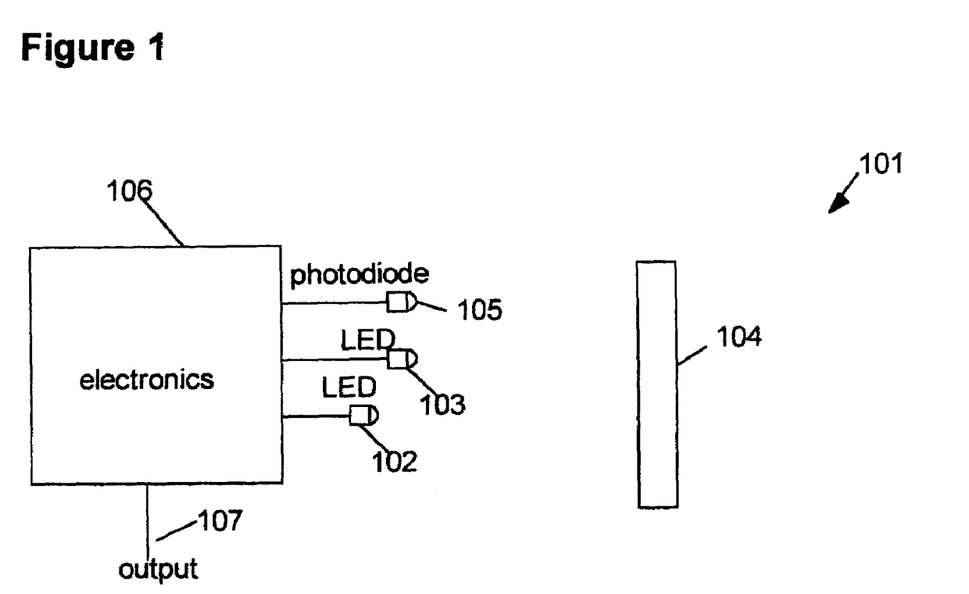
FIG. 1 is a block diagram of a preferred embodiment of the distance measuring system of the present invention.

FIG. 1 is a block diagram of a preferred embodiment of a distance measuring system 101 of the present invention, in which a "far" light source 102 and a "near" light source 103 are located at different distances from an object 104. Preferably, the light sources 102 and 103 have equal intensities and are LEDs (light-emitting diodes). Electronics 106 provides driving signals to sequentially illuminate the light source 102 and the light source 103. A light detector 105, preferably a photodiode, sequentially receives light from the light source 102 and the light source 103 that is reflected from the object 104. Preferably, the light sources 102 and 103 and the light detector 105 are located adjacent each other and contained in a single device. While for certain applications the light sources 102 and 103 need only be sequentially illuminated once, for other applications the light sources 102 and 103 are repeatedly illuminated sequentially for a selected period of time to obtain a distance measurement or distance measurements between the device housing the light sources and light detector and an object. Typically, the near light source 103 of the system 101 is from 2 to 10 centimeters closer to the object 104 than the far light source 102. Preferably, the light sources 102 and 103 and the light detector 105 are located and oriented relative to each other so that the light beams emitted by the light sources 102 and 103 and the resulting light beams from the object 104 that are detected by the light detector 105 are substantially collinear over a distance measuring range selected for the system. The emitted light beams and the reflected light beams detected by the system are separated preferably by 10 centimeters or less, more preferably by 5 centimeters or less, and most preferably by 2 centimeters or less over the selected distance measuring range. With this arrangement of the light sources 102 and 103 and the light detector 105, within the distance measuring range of the system, the light beams emitted by the light sources 102 and 103 and the resulting light beams reflected off of the object 105 and detected by the light detector 105 are reflected from the same or substantially the same common area of the object's surface. Typically, the light sources 102 and 103 and the light detector 105 are located immediately adjacent each other and oriented relative to each other so that the light beams emitted by the light sources 102 and 103 to be reflected from an object within the distance measuring range of the system and the light beams reflected from the object within the distance measuring range of the system and detected by the light detector 105 are substantially collinear or substantially collinear and intersect at a common point that is located in front of the system a distance that is from about half of the maximum selected distance of the measuring range to about the selected maximum distance of the measuring range for the system. In a typical distance measuring device utilizing the system 101, the system 101 of the device may be set up as follows: first, a preferred distance measuring range for the system is selected, e.g. a range from about 10 centimeters to about 5 meters, and second, the light sources 102 and 103 and the light detector 105 are then located immediately adjacent each other and oriented so that (i) the light sources 102 and 103 and the light detector 105 are each aimed at a common point a selected distance in front of the device, e.g. the detectors are aimed at a common point between about 2.5 and about 5 meters in front of the device, and (ii) the emitted light beams from the light sources 102 and 103 and the reflected light beams reflected from an object 104 within the distance measuring range of the system and detected by the light detector 105 are substantially collinear. With this arrangement, over a major portion of the measurement range, the light emitted by the light sources 102 and 103, reflected by the object 104, and detected by the light detector 105 will be reflected from the same or substantially the same area of the reflecting surface of the object 104.

If the object 104 is relatively near the light sources 102 and 103, for example, a distance that is five times the direct (straight line) distance between light source 102 and light source 103, the intensity of light received at the light detector 105 when the light source 103 is on will be significantly larger than the intensity of light received at the light detector 105 when the light source 102 is on. If, however, the object 104 is relatively far from the light sources 102 and 103, the intensity of light received at the light detector 105 when the light source 103 is on will be approximately equal to the intensity received at the light detector 105 when the light source 102 is on. Thus, the electronics 106, which is also connected to the light detector 105, can compute a direct (straight line) distance value from the light source 103 to the object 104 by using the relationship between the two intensities of reflected light input to the light detector 105 from the light emitted by the light sources 102 and 103 and reflected back to the light detector 105 by the object 104. The above relationship in intensities is true regardless of the reflectivity of object 104. Thus, when using light to measure the distance to an object, the present invention provides a way to cancel out the adverse affect that an object's reflectivity may have on the accuracy of such a distance measurement. Likewise, if the surface of the object 104 reflecting the light from the light sources 102 and 103 is not oriented perpendicularly to the direction of the light emitted from the light sources 102 and 103, the change in received intensity of reflected light by the detector 105 from the object 104 due to the surface angle of the object 104 will be substantially equal for the light sources 102 and 103. Thus, when using light to measure the distance to an object, the present invention also provides a way to cancel out the adverse affect that an object's surface angle may have on the accuracy of such a distance measurement. Furthermore, if the object 104 is of complex shape, the object 104 can be thought of as a collection of tiny surfaces. The superposition of these tiny surfaces will thus provide a way to cancel out the affect of shape when measuring distances using light.

Preferably, the light sources 102 and 103 illuminate an area larger than the area over which the light detector 105 is sensitive. This is preferable so that if the reflecting surface of the object 104 is near the edge of the area illuminated by either light source 102 or 103 and an equal area of the reflecting surface is thereby not illuminated by both of the light sources 102 and 103, significant errors in the distance measurement will not be caused. As discussed above, for the purposes of simplicity, the light sources 102 and 103 of the distance measuring system 101 are of equal intensity. However, provided the relative intensities of the light sources 102 and 103 are known, the electronics 106 can be set up to compute the direct distance from the light source 103 to an object 104 utilizing light sources 102 and 103 of different intensities. While, the distance measured for the distance measurement of the system 101 has been the distance from the near light source 103 to the object 104, electronics 106 may be set up to measure the distance from the far light source 102 or the light detector 105. Since the distances of the light sources 102 and 103 and the light detector 105 to the object 104 typically vary no more than 2 to 10 centimeters, either of the light sources or the light detector may be used to define the distance from the device embodying the system 101 to the object 104 without substantially affecting the accuracy of the system.

Figure 2:
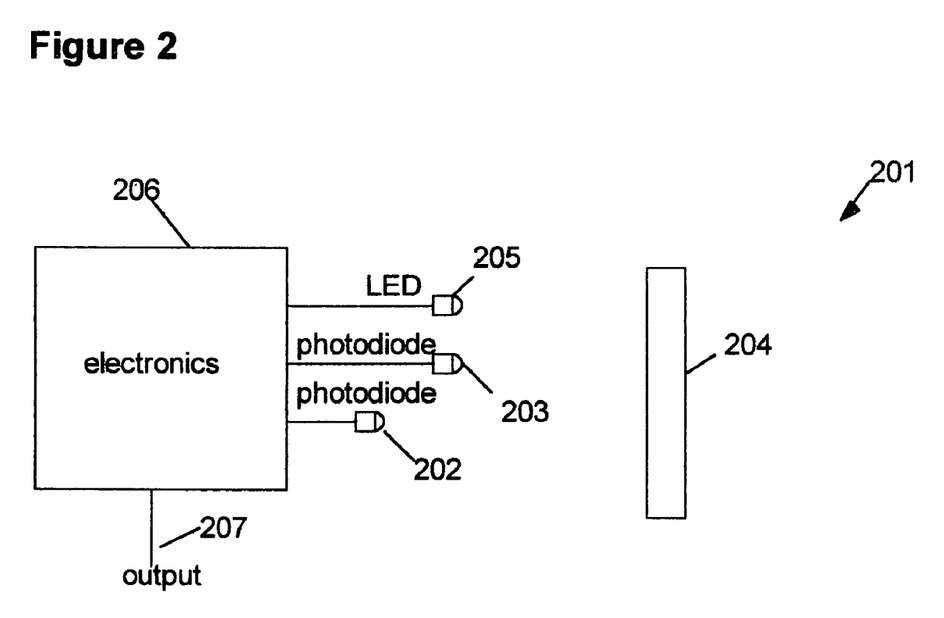
FIG. 2 shows a diagram of an alternate embodiment of the distance measuring system of the present invention.

FIG. 2 shows a diagram of an alternate embodiment 201 of the distance measuring system of the present invention. In this embodiment, a single light source 205 is used to illuminate an object 204. Two light detectors 202 and 203, preferably photodiodes, are located at different direct (straight line) distances from the object 204. Preferably, the light detectors 202 and 203 and the light source 205 are located adjacent each other and contained in a single unit. Typically, the near light detector 203 is from 2 to 10 centimeters closer to the object 204 than the far light detector 202. Preferably, the light detectors 202 and 203 are located and oriented relative to each other and the light source 205 so that the light beam emitted by the light source 205 and the resulting reflected light beams from the object 204 detected by the light detectors 202 and 203 are substantially collinear over a distance measuring range selected for the system. The emitted light beams and the reflected light beams detected by the system are separated preferably by 10 centimeters or less, more preferably by 5 centimeters or less, and most preferably by 2 centimeters or less over the selected distance measuring range. With this arrangement of the light detectors 202 and 203 and the light source 205, within the distance measuring range of the system, the light beam emitted by the light source 205 and the resulting light beams reflected off of the object 205 and detected by the light detectors 202 and 203 are reflected from the same or substantially the same common area of the object's surface. Typically, the light source 205 and the light detectors 202 and 203 are located immediately adjacent each other and oriented relative to each other so that the light beam emitted by the light source 205 to be reflected from an object within the distance measuring range of the system and the light beams reflected from the object within the distance measuring range of the system and detected by the light detectors 202 and 203 are substantially collinear or substantially collinear and intersect at a common point that is located in front of the system a distance that is from about half of the maximum selected distance of the measuring range to about the selected maximum distance of the measuring range for the system. In a typical distance measuring device utilizing the system 201, the system 201 of the device may be set up as follows: first, a preferred distance measuring range for the system is selected, e.g. a range from about 10 centimeters to about 5 meters, and second, the light detectors 202 and 203 and the light source 205 are then located immediately adjacent each other and oriented so that (i) the light detectors 202 and 203 and the light source 205 are each aimed at a common point a selected distance in front of the device, e.g. the detectors are aimed at a common point between about 2.5 and about 5 meters in front of the device, and (ii) the emitted light beam from the light source 205 and the reflected light beams reflected from an object 204 within the distance measuring range of the system and detected by the light detectors 202 and 203 are substantially collinear. With this arrangement, over a major portion of the measurement range, the light emitted by the light source 205, reflected by the object 204, and detected by the light detectors 202 and 203 will be reflected from the same or substantially the same area of the reflecting surface of the object 204.

Electronics 206 uses the signals generated by the received intensities from light detectors 202 and 203 to compute the distance from a device embodying the system 201 to the object 204. This is analogous to the way the two sequentially measured intensities from light detector 105 are used in system 101, above, to measure the direct distance from a device embodying the system 101 to the object 104.

Preferably, the light detectors 202 and 203 are sensitive to light over a larger area than is illuminated by the light source 205. This is preferable so that if object 204 is near the edge of the area detected by either light detector and an equal area of the reflecting surface is thereby not detected by both of the light detectors 202 and 203, significant errors in the distance measurement will not be caused.

Figure 3:
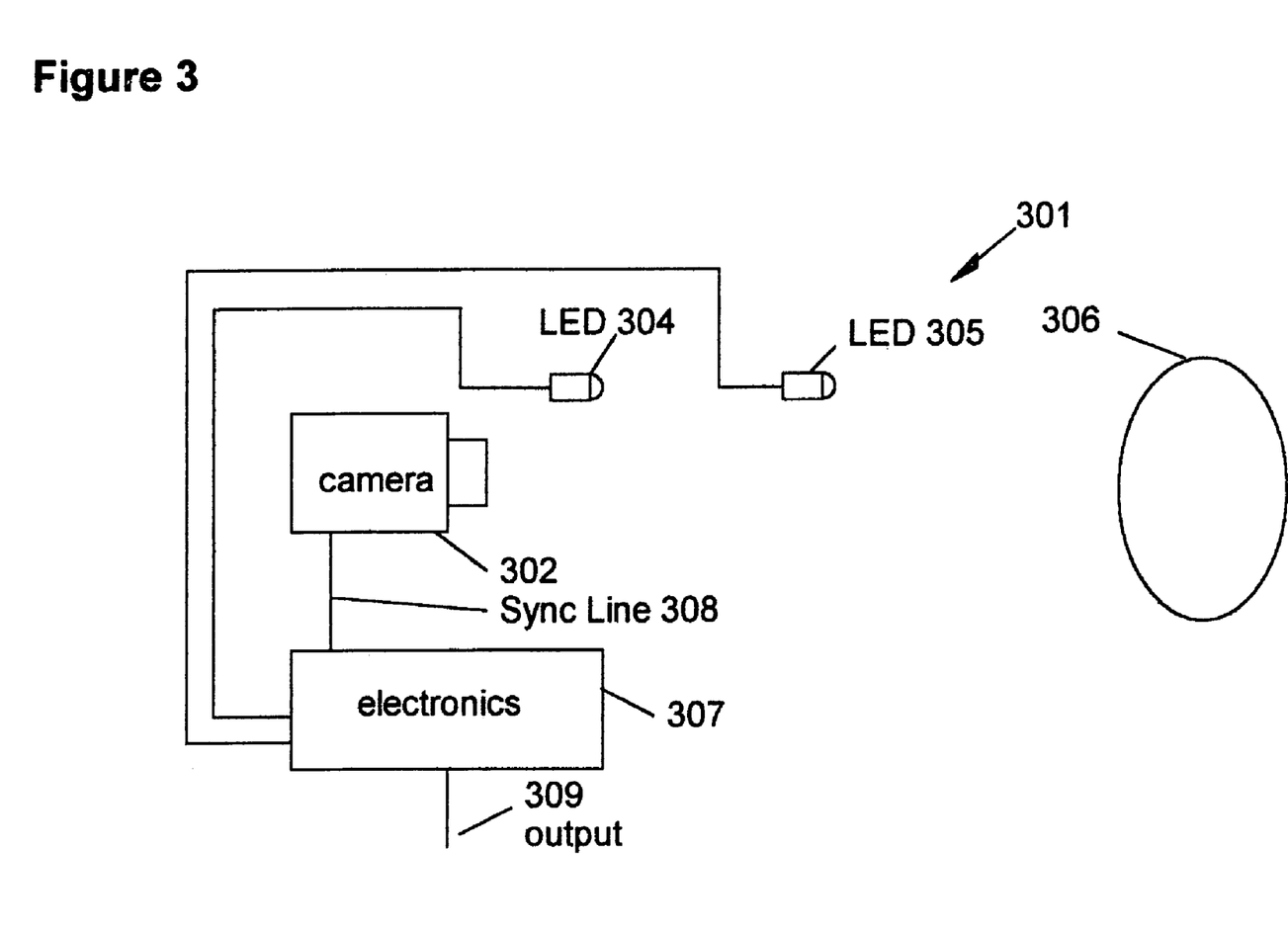
FIG. 3 is a block diagram of a distance imager system of the present invention.

FIG. 3 shows another embodiment of the invention. Distance imager system 301 produces an array of distance measurements to an object 306 corresponding to pixels in an image. This embodiment of the present invention could be used, for example, as a face shape sensor in a security system. In this embodiment of the present invention, light sources 304 and 305, preferably of equal intensity, are sequentially and, preferably, repeatedly illuminated by electronics 307. During each activation of one of the light sources 304 and 305, a digital camera 302 acquires one or more frames of image data from the light reflected to the camera 302 from the object 306. Preferably, the electronics 307 activates the light sources 304 and 305 in synchronization with the sync line 308, which is an output from the digital camera 302. Alternately, if the digital camera can be controlled by sync line 308, the electronics can command the camera to acquire frames of data by sync line 308 as each of the light sources 304 and 305 is illuminated. Methods for synchronizing the digital camera 302 and the electronics 307 will be apparent to those of ordinary skill in the art. The method of obtaining range or direct distance data is substantially the same as for the direct distance measurement system 101 of FIG. 1. In this embodiment, each pixel of the camera 302 can be thought of as a single light detector. Thus, a distance value can be calculated for each pixel in the image.

In operation, the distance measuring system 101, 201, or 301 is aimed toward the object 104, 204, or 306, respectively. The respective electronics lights the appropriate sources and stores the received intensities in memory. Based on these intensities, one or more distance values are computed, and provided through the output 107, 207, or 309.

Figure 4:
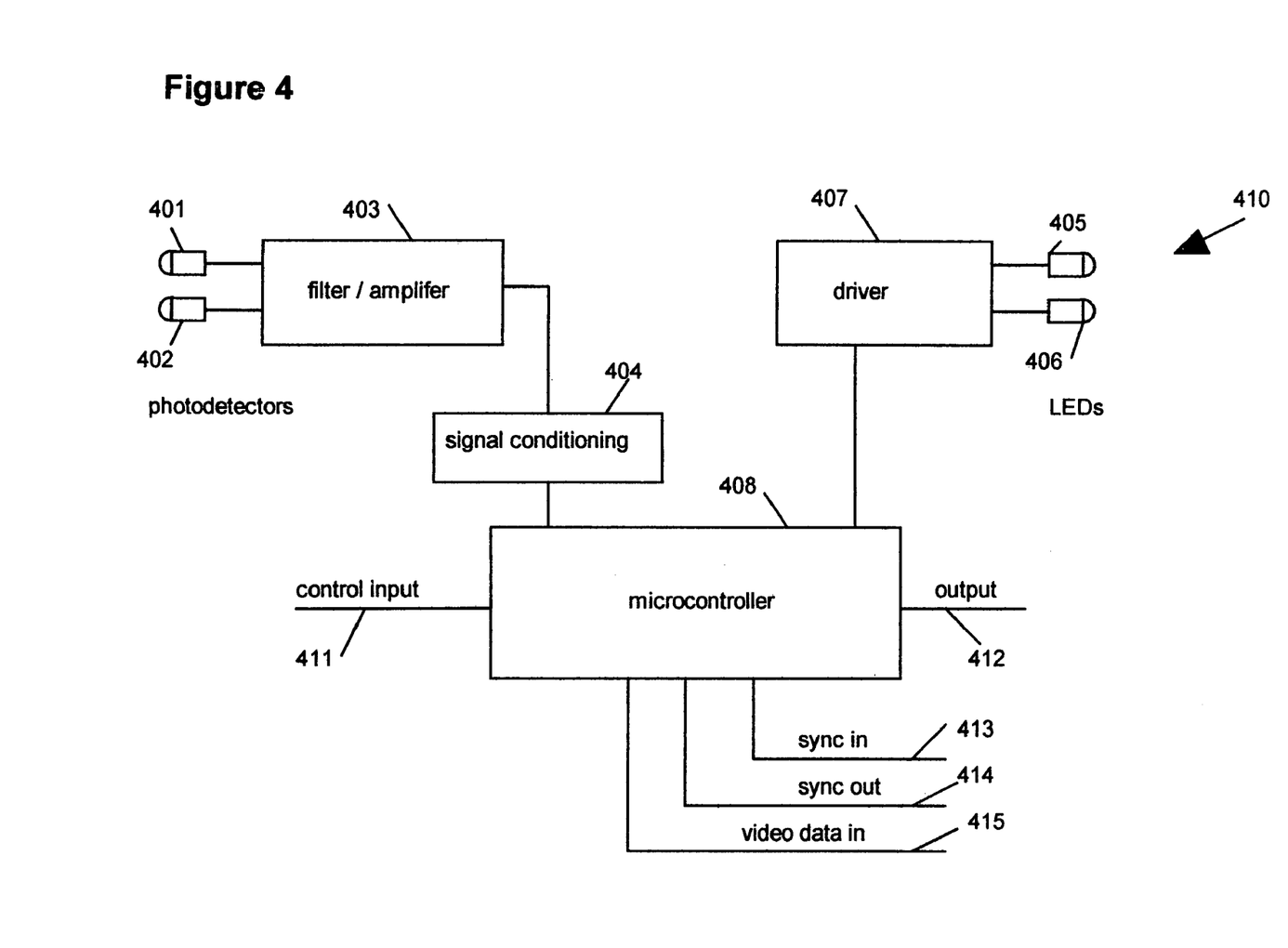
FIG. 4 is a block diagram of a preferred embodiment of an electronics module of the present invention.

FIG. 4 is a block diagram of a preferred embodiment of an electronics module 410 used in the distance measuring systems 101, 201, and 301 of the present invention. The LEDs 405 and 406 are illuminated, as needed, by a driver 407. The design of the driver 407 will be apparent to those of ordinary skill in the art. Preferably, the driver 407 provides a modulated driving signal to the LEDs 405 and 406; for example, the driving signal may be in the range of 100 Hz to 100 kHz. Photodetectors 401 and 402 serve as light detectors. Filter/amplifier 403 accepts the signals from the photodetectors and brings them to a useful voltage level. If the driver 407 provides modulated signals, the Filter/amplifier 403 preferably includes a filter, for example, a band pass filter, to extract the modulated signal from the background noise. A signal conditioner 404 takes the signal from the amplifier 403 and converts it into the format required by a microcontroller 408. Preferably, this includes the conversion of the signal amplitude into a voltage between 0 and 5 volts, for input to an analog-to-digital input of the microcontroller 408. If the driver 407 provides modulated driving signals, the signal conditioner 404 preferably includes a demodulation circuit, such as a peak detector. The signal conditioner 404 also preferably includes voltage-limiting circuitry to prevent excessive input voltages to the microcontroller 408. The design of these circuits will be apparent to those of ordinary skill in the art.

The microcontroller 408 includes a control input 411, preferably a serial data line, for example, from a PC. This input is monitored by the microcontroller software to set parameters, for example, data acquisition rate and modulation frequency. This input also preferably includes commands such as to begin and end measurement functions. The microcontroller 408 also includes a data output 412, preferably a serial data line, for example, to a PC. This output provides the distance measurements computed by the microcontroller software. The design of the control input and data output circuitry will be apparent to those of ordinal skill in the art.

Optionally, the microcontroller 408 includes a camera sync input 413, if a digital camera is used for data acquisition. The sync input 413 is used by the software to sequentially illuminate the LEDs 405 and 406, so that the correct LEDs are illuminated during each frame of video data. Optionally, the microcontroller 408 includes a camera sync output 414, if a digital camera accepting sync input pulses is being used. The sync output 414 is used by the software to command the camera to start the acquisition of a frame of video data at the correct time, in synchronization with the lighting of the correct LEDs. Video data in 415 is used to obtain the pixel intensity measurements from the camera, for performing the distance calculations. The electronics circuitry for these functions will be apparent to those of ordinal skill in the art.

In all embodiments of the present invention described above, a set of two or more light intensity measurements are obtained for each distance measurement desired. The algorithm to calculate distances from the light intensities is described here in connection with embodiment 101, but applies equally to embodiments 201 and 301.

The algorithm is based on a mathematical illumination model. In the preferred embodiment of the invention, the algorithm is based on a diffuse reflection illumination model (see Foley & van Dam, "Fundamentals of Interactive Computer Graphics", Addison-Wesley Publishing Company, Inc., © 1982, pp. 575–580). Preferably, if it is assumed that the direct (straight line) spacing between light sources 102 and 103 is given by D, the unknown distance from the light source 103 to object 104 is L, and the surface angle of object 104 with respect to the direction of light source 103 is Q, the light intensity detected by light detector 105 from light source 103, i103, is given by:

$$i103 = k \cos Q/L^2$$

and the light intensity detected from light source 102, i102, is $$i102 = k \cos Q/(L+D)^2$$

The ratio of these two measurements is then $$i101/i102 = (L+D)^2/L^2$$

The algorithm solves this expression for L, using solution techniques apparent to those of ordinary skill in the art. For a system with multiple measurements, for example, the distance imager system 301, this is repeated for each measurement point, for example, for each pixel in the acquired images. Techniques for implementation of the algorithm in the microcontroller or in an external device, such as but not limited to a personal computer, will be apparent to those of ordinary skill in the art.

Figure 5:
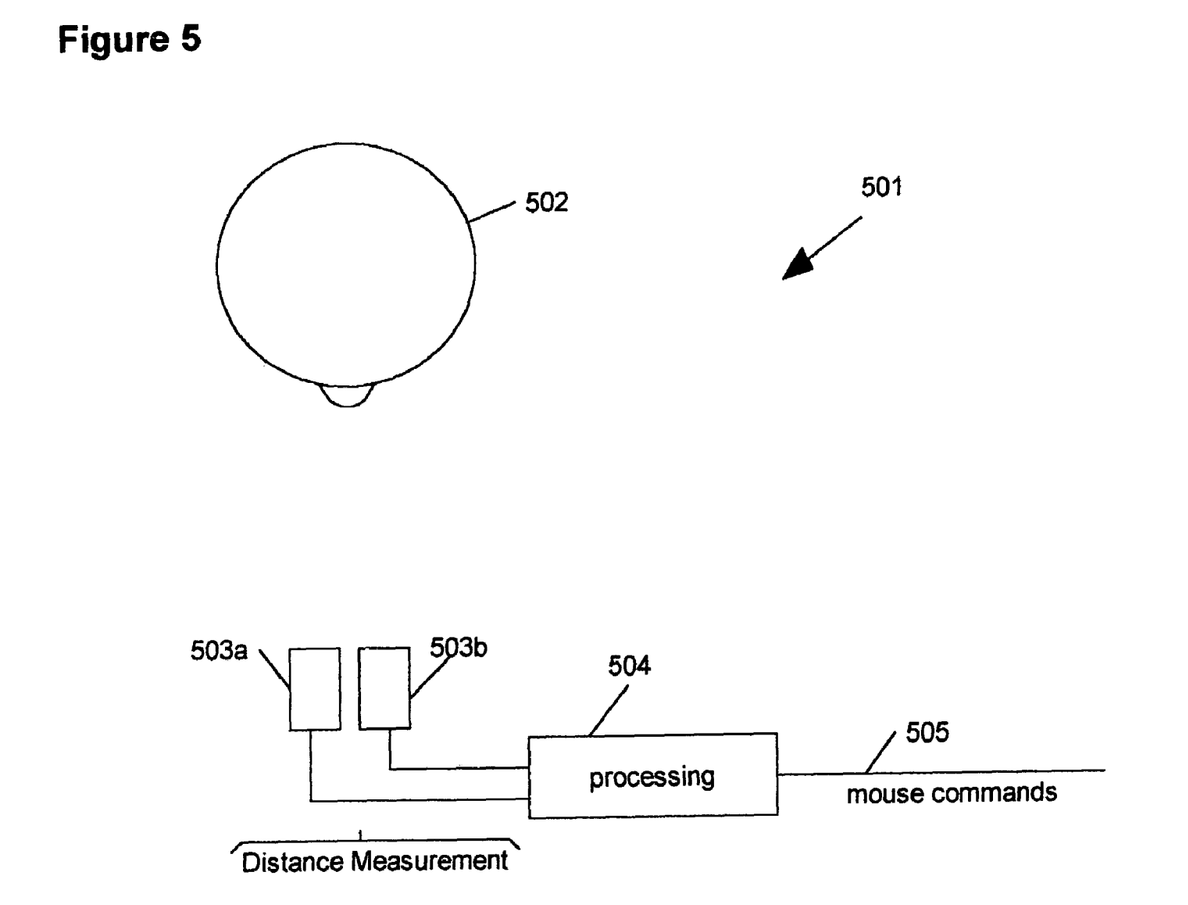
FIG. 5 is a block diagram of the present invention being applied as a head tracking device.

FIG. 5 is a block diagram of the present invention being applied as a head tracking device 501, for example, a head tracking device for disabled persons, such as people who cannot use their hands to control a computer mouse. In this embodiment, the invention is used to provide mouse commands, so that the disabled user can perform mouse functions by moving his or her head 502, rather than through the use of the mouse. The head tracking device 501 makes distance measurements to several locations on the user's head 502, and generates mouse commands to an output 505 from these measurements.

In a preferred embodiment of this application, distance measurement devices 503a and 503b are used to make distance measurements to areas on the left and right parts of the head, respectively. Preferably, the measurement devices 503a and 503b are measurement systems such as distance the measuring system 101. Alternately, other embodiments of the present invention can be used as the measurement devices 503a and 503b. When the user moves his or her head 502 to the left, the average distance measured by device 503a will tend to decrease, whereas the average distance measured by device 503b will tend to increase. If the measurement devices 503a and 503b are aimed toward the forehead, as the user tilts the head forward, the average distances measured by both measurement devices will tend to decrease. Processing 504 takes the distance measurements and the changes in distance measurements to calculate head motion parameters, and then converts these into mouse commands, which are sent to a computer through the output 505.

Figure 6:
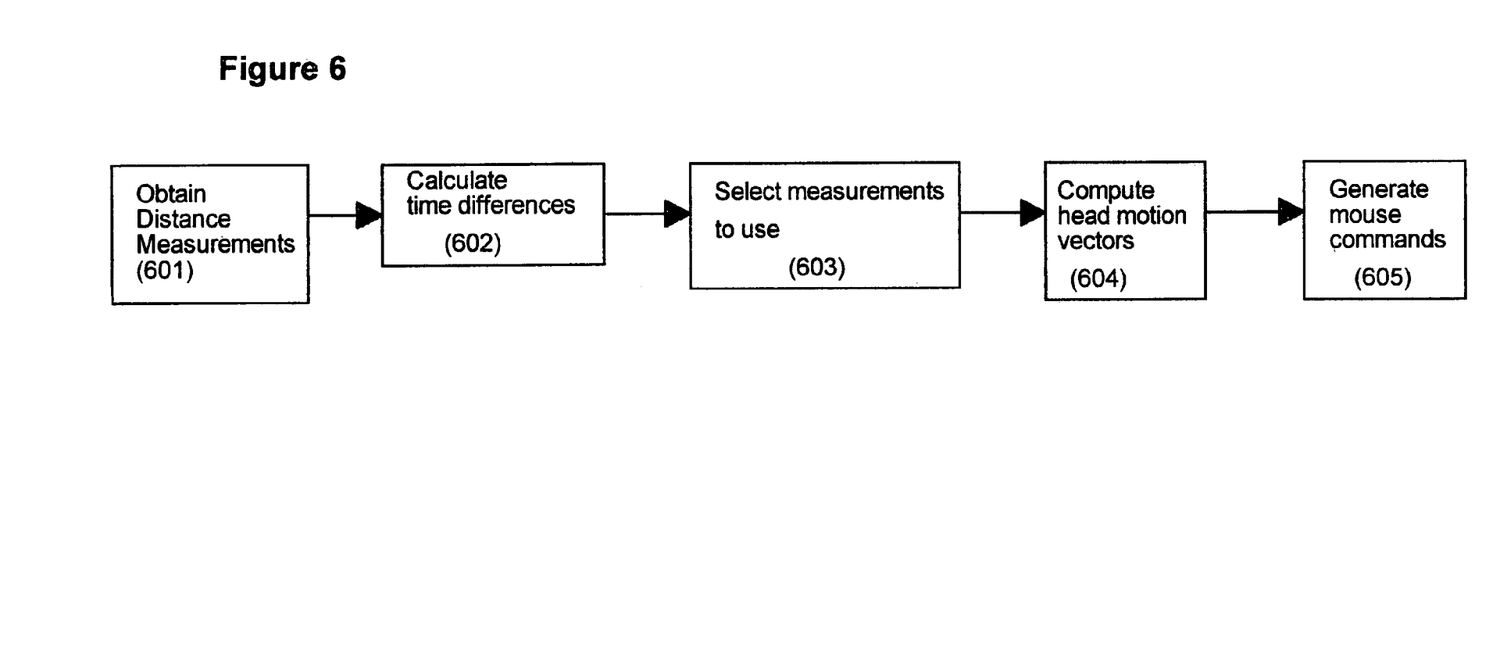
FIG. 6 is a flowchart showing the process of generating computer mouse commands from the distance measurements.

FIG. 6 is a flowchart showing the process of generating mouse commands from the distance measurements. First, in step 601, the distance measurements are obtained, as described above. Preferably, in step 602, the changes over time of each distance are obtained. Alternately, the actual distances could be used for computing head pointing information. In step 603, a subset of the measurements is selected to use. If there are only two measurements, such as in the preferred embodiment of FIG. 5, all measurements are used. Alternately, if a larger set of measurements is used, two are selected, for example, the pair of side by side measurements with the greatest time difference could be selected. Alternately, all measurements could be used with a weighting system based on the relative time differences. From the selected measurements, a head motion vector is computed in step 604. In the preferred embodiment, the difference between the left and right measurements from devices 503a and 503b is used as the horizontal component of the motion vector, and the sum of the left and right measurements is used as the vertical component. Finally, in step 605, the vector is converted into a mouse command. For example, the head motion vector from step 604 can be converted into the horizontal and vertical components of the mouse command. The implementation of each of these steps will be apparent to those of ordinary skill in the art.

Figure 7:
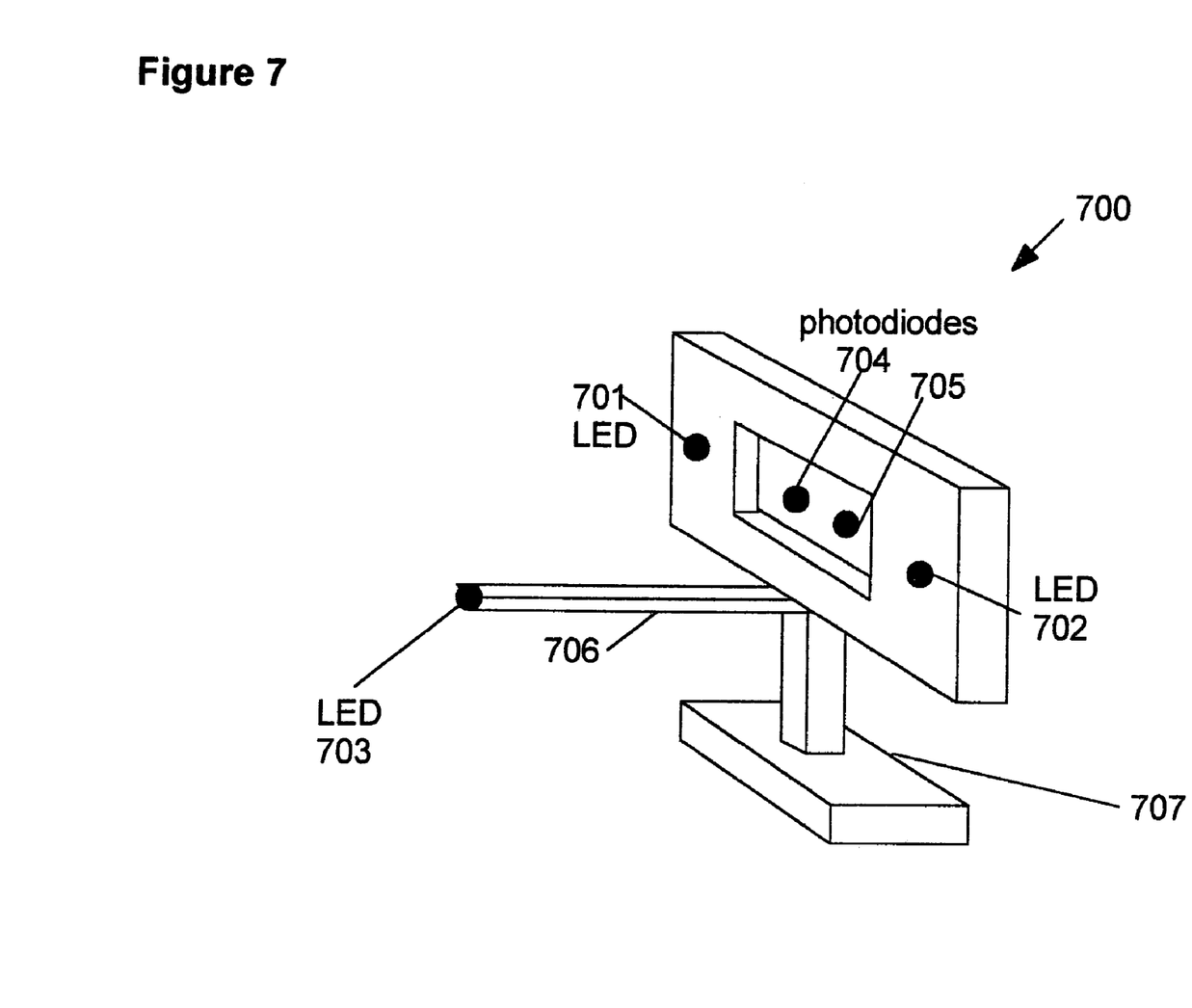
FIG. 7 illustrates a preferred embodiment of a head tracking optical unit that shares some of the components of two distance measuring devices of the present invention.

FIG. 7 illustrates a preferred embodiment of a head tracking optical unit 700 that shares some of the components of two distance measuring devices, such as devices 503a and 503b in FIG. 5. Rather than completely independent sets of LEDs and photodiodes, some components are shared. Photodiode 704 and photodiode 705 are the light detectors for the two distance measuring devices, and are oriented so that they detect light from horizontally offset areas of the user's face. The LED 703, held in its position by arm 706, serves as the "near" LED for both measuring devices. LED 701 and LED 702 are simultaneously illuminated to serve as the "far" LED for both measuring devices. Preferably, all LEDs are arranged to avoid direct transmission of light to photodiodes 704 and 705. The entire unit is preferably mounted on stand 707, which can contain adjustments to aim the light at the user's face. Connection and use of the head tracking optical unit 700 according to the present invention will be apparent to those of ordinary skill in the art.

Figure 8:
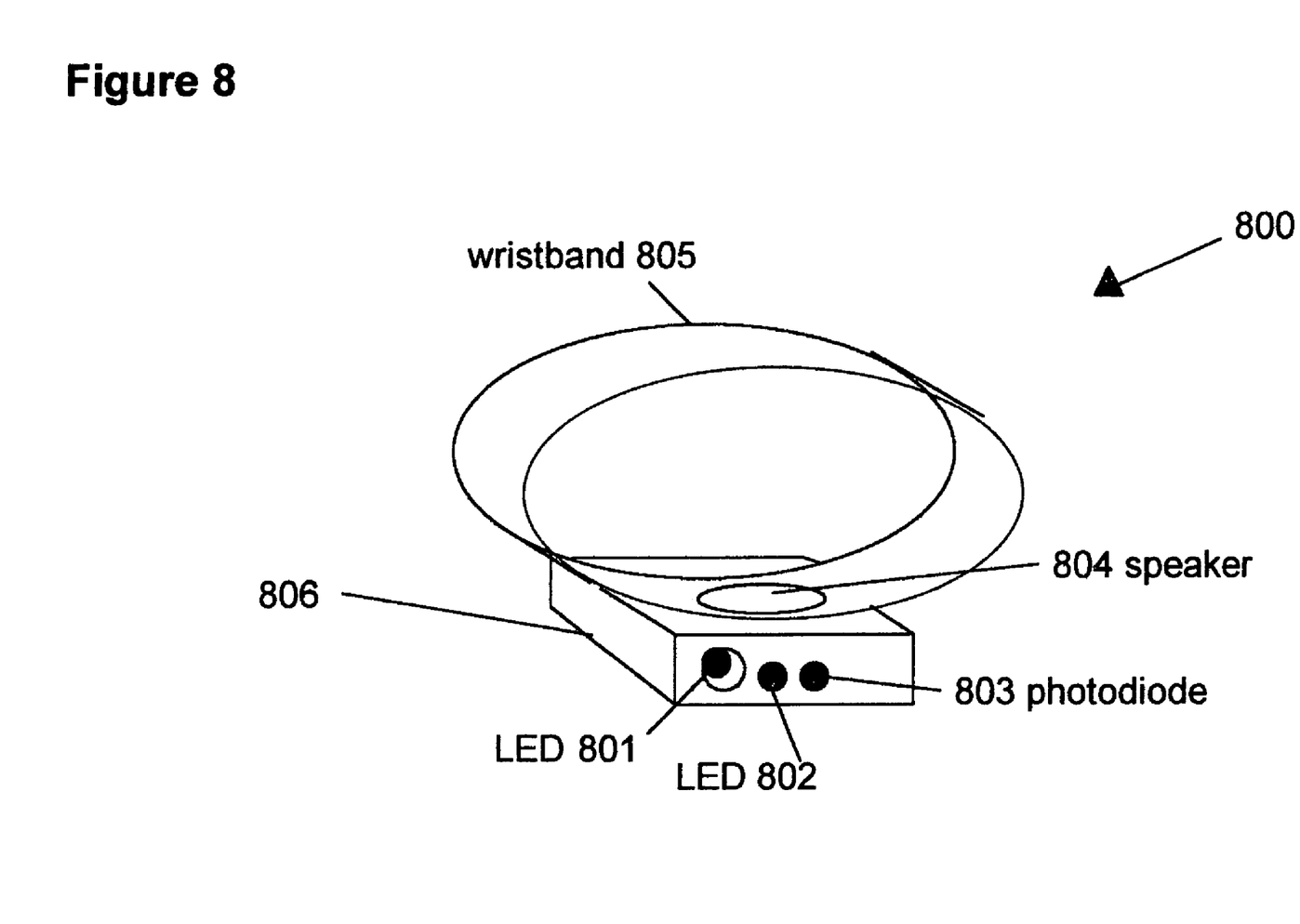
FIG. 8 illustrates an application of the present invention as wristband distance sensor.

The present invention can also be used as an aid for blind people to locate nearby objects. FIG. 8 illustrates a preferred embodiment of this application, as wristband distance sensor 800. A wristband 805 holds enclosure 806, containing the electronics circuitry. Preferably, the LEDs and photodiodes are configured according the preferred embodiment of the distance measuring device 101. LED 801 is the "far" LED and LED 802 is the "near" LED. Photodiode 803 receives the reflected light signals transmitted by the LEDs.

Preferably, the output of the distance sensor is a vibration signal that can be felt by the user. For example, a miniature speaker 804 can be attached to the wristband 805, so that the vibration is easily felt on the user's wrist. The speaker preferably is controlled to vary its vibration frequency as a function of the measured distance. Alternately, the amplitude, or both amplitude and frequency could be varied. The mechanical and electrical design and connection of these parts according to the present invention will be apparent to those of ordinary skill in the art.

Figure 9:
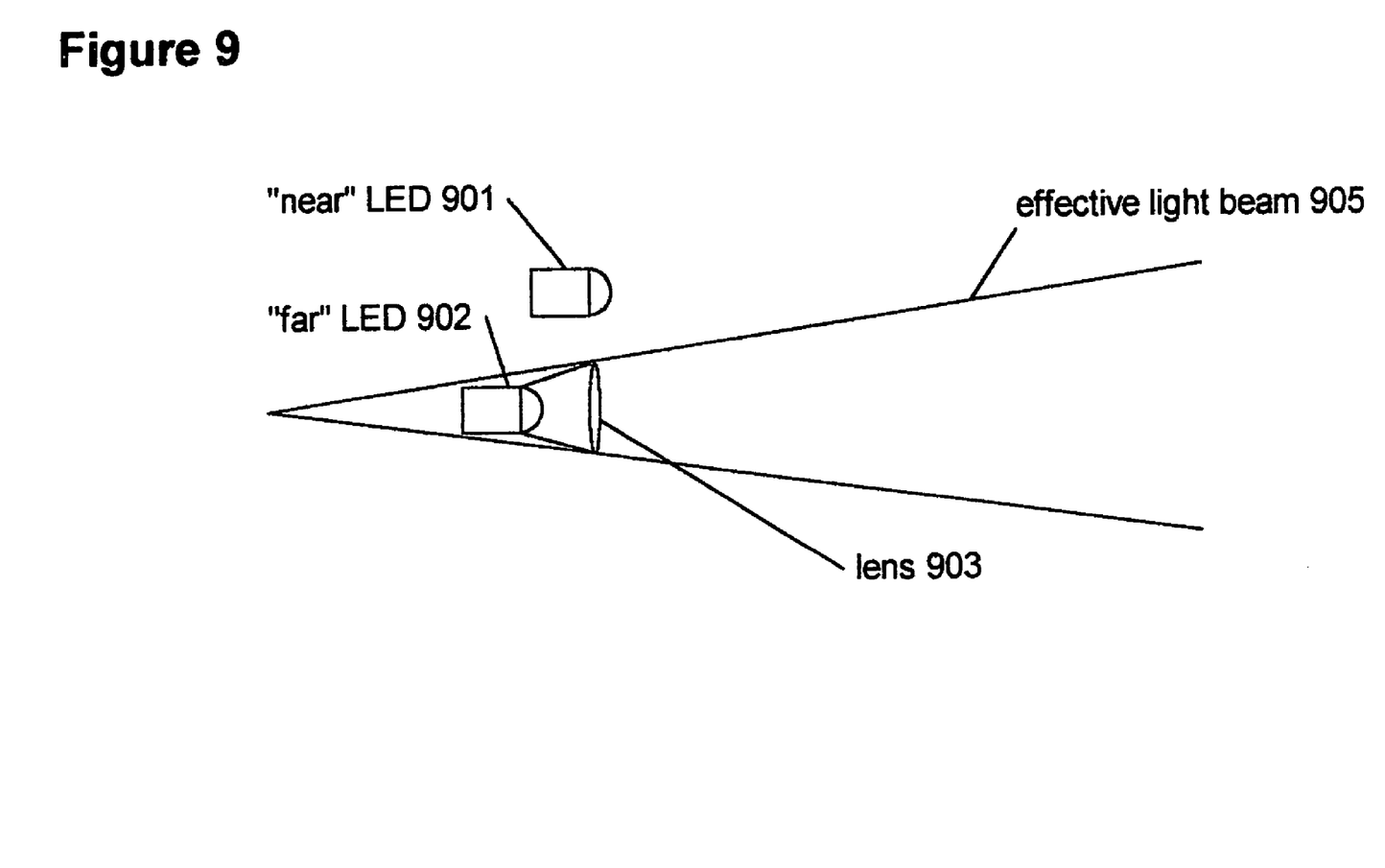
FIG. 9 shows an alternate embodiment of an optical arrangement of light-emitting diodes using a lens.

FIG. 9 shows an alternate embodiment for the near and far light sources 102 and 103 of the system 101. In the embodiment of FIG. 9, the alternate embodiment has an optical arrangement of a "near" LED 901 and a "far" LED 902. This embodiment is useful for applications where the maximum allowable distance between the two LEDs is limited. For example, this could be done in the wristband distance sensor 800. A lens 903 is placed in the light path of the "far" LED 902. The lens bends the light beam 905 such that the effective optical distance from the LED 902 to the reflective surface of the object is greater than the physical distance. For example, a convex lens may be used for this purpose. Optionally, a lens could be placed in front of the "near" LED 901 to make the optical distance from the "near" light detector to the reflective surface of the object less than the physical distance to the reflecting surface of the object.

Figure 10:
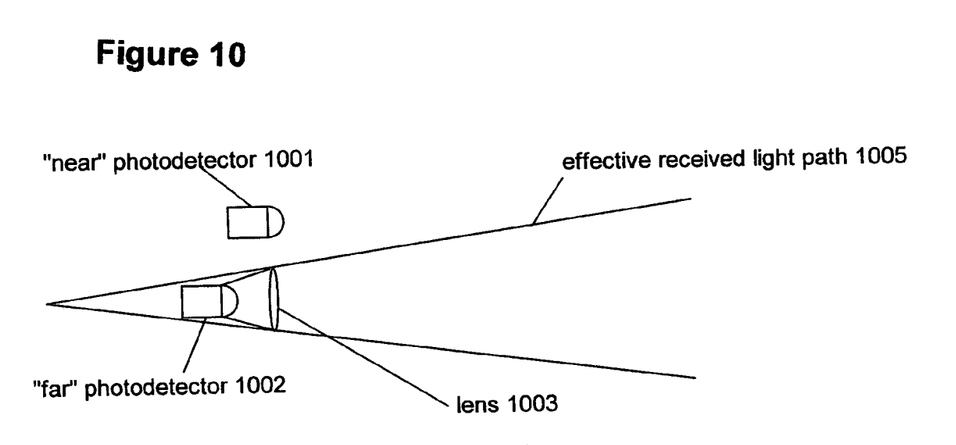
FIG. 10 shows an alternate embodiment of an optical arrangement of photodiodes using a lens.

FIG. 10 shows an alternate embodiment of the optical arrangement for the "near" and "far" light detectors 203 and 202 used in the system 201. This embodiment is useful for applications where the maximum allowable distance between the two light detectors is limited. For example, this could be done in the wristband distance sensor 800. A lens 1003 is placed in the reflected light path of the "far" light sensor 1002. The lens bends the reflected light beam from the object such that the effective optical distance from the reflective surface of the object to the "far" light sensor 1002 is greater than the physical distance. For example, a convex lens may be used for this purpose. Optionally, a lens could be placed in front of the "near" light detector 1001 to make the optical distance from the reflective surface of the object to the "near" light detector less than the physical distance to the reflecting surface of the object. The selection of lenses and arrangement of the components to do this will be apparent to those of ordinary skill in the art.

Accordingly, the reader will see that the present invention can be used in a wide variety of distance measurement applications. Many of the embodiments of the present invention do not require the use of lenses or other light focusing mechanisms, and have very simple optical designs. High frequency pulses and electronics are not required by the present invention. Thus, the present invention solves the problems cost and complexity of many previous optical distance measurement approaches.

While there has been illustrated and described what is at present considered to be the preferred embodiment of the present invention, it will be understood by those skilled in the art that various changes and modifications may be made and equivalents may be substituted for elements thereof without departing from the true scope of the invention. For example, more than two light sources or light detectors could be used to obtain additional information or increased accuracy about the distance or angle to a target object. Specular reflection models (see Foley & van Dam, pp. 577–580) could alternately be used to obtain distance measurements. Other types of light sources, such as fluorescent or incandescent light could be used. Other types of light detectors, such as phototransistors and photocells could be used. Instead of sequential illumination of the light sources, the simultaneous illumination of light sources of different colors or modulation frequencies could be utilized. The head tracker could be used for many other tracking applications, such as following the motion of hands or feet or other body or mechanical parts. Many other configurations of the distance measuring device for blind people could be created, such as hand-held, or clothing-mounted configurations. Arrays of distance measuring devices, possibly sharing some light sources or detector components could be used with the present invention. Applications include a row of distances to monitor patients' position in beds. Therefore, it is intended that this invention not be limited to the particular embodiment disclosed, but that the invention will include all embodiments falling within the scope of the appended claims.

What is claimed is:

1. A computer control system for controlling a pointer on a computer comprising:
   a) an optical unit, the optical unit comprising:
   i.) an enclosure; and
   ii.) at least two optical distance measurement devices, comprising
      at least one left optical distance measurement device that measures distance from the enclosure to an area that includes portions of a left side of a person's head and has an output that is a function of the distance from the enclosure to the area that includes the left side of the person's head, and at least one right optical distance measurement device that measures distance from the enclosure to an area that includes portions of a right side of a person's head and has an output that is a function of the distance from the enclosure to the area that includes the portions of the right side of the person's head;

b) a vertical motion processing means wherein a vertical motion vector is computed;

c) a horizontal motion processing means wherein a horizontal motion vector is computed, based on an increase or decrease of the output of the left optical distance measuring device relative to the output of the right optical distance measuring device; and d) output processing means that computes a resultant motion of a computer pointer based on the vertical motion vector and the horizontal motion vector and outputs the resultant motion to a computer.

2. The computer control system of claim 1, wherein:

the left optical distance measurement device comprises a left light source means for emitting light to be reflected from an area that includes portions of a left side of a person's head and a left light detector means for detecting light intensity of light emitted by the left light source means and reflected to the left light detector means by the area that includes the portions of the left side of the person's head and for generating electrical signals based on light intensity detected; the left light source means and the left light detector means being aimed so that the left light detector means detects light emitted by the left light source means and reflected to the left light source means from the area that includes the portions of the left side of the person's head; the left light source means comprising multiple light sources located at different optical distances from the area that includes the portions of the left side of the person's head when the left optical distance measuring device is in use or the left light detector means comprising multiple light detectors located at different optical distances from the area that includes the portions of the left side of the person's head when the left optical distance measuring device is in use;

the right optical distance measurement device comprises a right light source means for emitting light to be reflected from an area that includes portions of a right side of a person's head and a right light detector means for detecting light intensity of light emitted by the right light source means and reflected to the right light detector means by the area that includes the portions of the right side of the person's head and for generating electrical signals based on light intensity detected; the right light source means and the right light detector means being aimed so that the right light detector means detects light emitted by the right light source means and reflected to the right light detector means from the area that includes the portions of the right side of the person's head; the right light source means comprising multiple light sources located at different optical distances from the area that includes the portions of the right side of the person's head when the right optical distance measuring device is in use or the right light detector means comprising multiple light detectors located at different optical distances from the area that includes the portions of the right side of the person's head when the right optical distance measuring device is in use;

electronics means for receiving the electronic signals generated by the left and right light detector means and outputting a distance measurement; and reflectivity and shape cancellation means for computing a distance from the left light source means to the area that includes the portions of the left side of the person's head that computes the distance by using the relationship between the intensities detected over the multiple optical distances being reflected from the area that includes the portions of the left side of the person's head and for computing a distance from the right light source means to the area that includes the portions of the right side of the person's head that computes the distance by using the relationship between the intensities detected over the multiple optical distances being reflected from the area that includes the portions of the right side of the person's head.

3. The computer control system according to claim 2, wherein:

the vertical motion processing means comprises means wherein the vertical motion vector is computed, based on the average of the outputs from the left optical distance measurement device and/or the right optical distance measurement device; and the horizontal motion processing means comprises means wherein the horizontal motion vector is computed, based on the difference of the outputs from the left optical distance measurement device and the right optical distance measurement device.

4. The computer control system according to claim 2, wherein:

the left light source means comprises two light sources located at different optical distances from the area that includes the portions of the left side of the person's head when the left optical distance measuring device is in use; and the left light detector means comprises one light detector;

the right light source means comprises two light sources located at different optical distances from the area that includes the portions of the right side of the person's head when the right optical distance measuring device is in use; and the right light detector means comprises one light detector; and the electronics means comprises means for sequentially illuminating the two light sources of the left light source means to enable the left optical distance measuring device to obtain a measurement of the distance from the left optical distance measuring device to the area that includes the portions of the left side of the person's head and for sequentially illuminating the two light sources of the right light source means to enable the right optical distance measuring device to obtain a measurement of the distance from the right optical distance measuring device to the area that includes the portions of the right side of the person's head.

5. The computer control system according to claim 4, wherein:

lens means is used to affect the optical distance from one of the light sources of the left light source means to the area that includes the portions of the left side of the person's head when the left optical distance measuring device is in use and to affect the optical distance from one of the light sources of the right light source means to the area that includes the portions of the right side of the person's head when the right optical distance measuring device is in use.

6. The computer control system according to claim 2, wherein:
the reflectivity and shape cancellation means comprises means to compute a distance from the left light source means to the area that includes the portions of the left side of the person's head, based on a ratio of intensities detected over the multiple optical distances being reflected from the area that includes the portions of the left side of the person's head and means to compute a distance from the right light source means to the area that includes the portions of the right side of the person's head, based on a ratio of intensities detected over the multiple optical distances being reflected from the area that includes the portions of the right side of the person's head.

7. The computer control system according to claim 2, wherein:
the left light source means comprises one light source; and the left light detector means comprises two light detectors located at different optical distances from the portions of the left side of the person's head when the left optical distance measuring device is in use; and
the right light source means comprises one light source; and the right light detector means comprises two light detectors located at different optical distances from the portions of the right side of the person's head when the right optical distance measuring device is in use.

8. The computer control system according to claim 7, wherein:
lens means is used to affect the optical distance from the portions of the left side of the person's head to one of the left light detectors when the left optical distance measuring device is in use and to affect the optical distance from the portions of the right side of the person's head to one of the right light detectors when the right optical distance measuring device is in use.

9. A method of controlling a pointer on a computer comprising:
providing an enclosure;
measuring at least one distance from the enclosure to a first area comprising a portion of the left side of a person's head;
measuring at least one distance from the enclosure to a second area comprising a portion of the right side of the person's head;
computing a vertical motion vector;
computing a horizontal motion vector based on the increase or decrease of a distance to the right portion of the person's head relative to a distance to the left portion of the person's head;
computing a resultant motion of a computer pointer based on the vertical motion vector and the horizontal motion vector; and
outputting the resultant motion to a computer to control a pointer on the computer.

10. The method of claim 9, wherein:
the measuring of distances from the enclosure to different areas of a person's head comprises:
providing at least one left optical distance measurement device comprising a left light source means for emitting light to be reflected from the area that includes the portions of the left side of the person's head and a left light detector means for detecting light intensity of light emitted by the left light source means and reflected to the left light detector means by the area that includes the portions of the left side of the person's head and for generating electrical signals based on light intensity detected; the left light source means comprising multiple light sources located at different optical distances from the area that includes the portions of the left side of the person's head when the left optical distance measuring device is in use or the left light detector means comprising multiple light detectors located at different optical distances from the area that includes the portions of the left side of the person's head when the left optical distance measuring device is in use; and aiming the left light source means and the left light detector means so that the left light detector means detects light emitted by the left light source means and reflected to the left light detector means from the area that includes portions of the left side of the person's head;

providing at least one right optical distance measurement device comprising a right light source means for emitting light to be reflected from the area that includes the portions of the right side of the person's head and a right light detector means for detecting light intensity of light emitted by the right light source means and reflected to the right light detector means by the area that includes the portions of the right side of the person's head and for generating electrical signals based on light intensity detected; the right light source means comprising multiple light sources located at different optical distances from the area that includes the portions of the right side of the person's head when the right optical distance measuring device is in use or the right light detector means comprising multiple light detectors located at different optical distances from the area that includes the portions of the right side of the person's head when the right optical distance measuring device is in use; and aiming the right light source means and the right light detector means so that the right light detector means detects light emitted by the right light source means and reflected to the right light detector means from the area that includes the portions of the right side of the person's head;

emitting light from the left light source means and reflecting the emitted light from the area that includes the portions of the left side of the person's head and detecting light intensity of the reflected light from the area that includes the portions of the left side of person's head with the left light detector means and generating electrical signals based on the light intensity detected;

emitting light from the right light source means and reflecting the emitted light from the area that includes the portions of the right side of the person's head and detecting light intensity of the reflected light from the area that includes the portions of the right side of person's head with the right light detector means and generating electrical signals based on the light intensity detected;

providing electronics means for receiving the electronic signals generated by the left and right light detector means and outputting distance measurements;

sending the electronic signals generated by the left and right light detector means to the electronics means; and canceling effects of reflectivity and shape by computing a distance from the left light source means to the area that includes the portions of the left side of the person's head using the relationship between the intensities detected over the multiple optical distances being reflected from the area that includes the portions of the left side of the person's head and by computing a distance from the right light source means to the area that includes the portions of the right side of the person's head using the relationship between the intensities detected over the multiple optical distances being reflected from the area that includes the portions of the right side of the person's head.

* * * * *